United States Patent
Selander et al.

(10) Patent No.: US 10,735,392 B2
(45) Date of Patent: Aug. 4, 2020

(54) METHOD AND DEVICE FOR ESTABLISHING A COMPUTATIONAL PUZZLE FOR USE IN COMMUNICATION BETWEEN A CLIENT AND A SERVER

(71) Applicant: Telefonaktiebolaget LM Ericsson (publ), Stockholm (SE)

(72) Inventors: Göran Selander, Bromma (SE); Elena Dubrova, Sollentuna (SE); Fredrik Lindqvist, Järfälla (SE); Mats Näslund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 183 days.

(21) Appl. No.: 15/566,397

(22) PCT Filed: Apr. 16, 2015

(86) PCT No.: PCT/SE2015/050439
§ 371 (c)(1),
(2) Date: Oct. 13, 2017

(87) PCT Pub. No.: WO2016/167693
PCT Pub. Date: Oct. 20, 2016

(65) Prior Publication Data
US 2018/0131679 A1    May 10, 2018

(51) Int. Cl.
*H04L 29/06* (2006.01)
*H04L 9/06* (2006.01)
*H04L 29/02* (2006.01)

(52) U.S. Cl.
CPC ............ *H04L 63/08* (2013.01); *H04L 9/0643* (2013.01); *H04L 63/12* (2013.01); *H04L 63/1458* (2013.01); *H04L 29/02* (2013.01)

(58) Field of Classification Search
CPC ........................................................ H04L 63/08
See application file for complete search history.

(56) References Cited

U.S. PATENT DOCUMENTS 7,231,526 B2 * 6/2007 Hon ..................... G06Q 20/367
                                                                       380/262
7,694,335 B1    4/2010 Turner et al.
(Continued)

FOREIGN PATENT DOCUMENTS

CN    101110762 A    1/2008
CN    102946387 A    2/2013
(Continued)

OTHER PUBLICATIONS

Lee, Isaac Chien-Wei. "A Novel Design and Implementation of Dos-Resistant Authentication and Seamless Handoff Scheme for Enterprise WLANs." (2010). (Year: 2010).*
(Continued)

*Primary Examiner* — Shawnchoy Rahman
(74) *Attorney, Agent, or Firm* — Murphy, Bilak & Homiller, PLLC

(57) ABSTRACT

The disclosure relates to a method (20) for a serving device (3) of establishing a computational puzzle for use in communication between a client device (2) and the serving device (3). The method (20) comprises establishing (21), in the serving device (3), the computational puzzle (p) based on a key shared by the client device (2) and the serving device (3) and on a solution (s', s") to the computational puzzle (p). Further method (30) in a serving device is provided, methods (60, 70) for client devices (2), serving devices (3), client devices (2), computer programs and computer program products.

20 Claims, 4 Drawing Sheets

(56) References Cited

U.S. PATENT DOCUMENTS

| | | | |
|---|---|---|---|
| 8,358,778 B2* | 1/2013 | Landrock | H04L 9/3236 |
| | | | 380/28 |
| 2003/0172159 A1 | 9/2003 | Schuba et al. | |
| 2004/0034773 A1* | 2/2004 | Balabine | A63F 13/12 |
| | | | 713/168 |
| 2004/0181571 A1* | 9/2004 | Atkinson | G06Q 10/107 |
| | | | 709/200 |
| 2006/0069804 A1 | 3/2006 | Miyake et al. | |
| 2007/0157300 A1 | 7/2007 | Sivaradjane et al. | |
| 2008/0172728 A1* | 7/2008 | Choyi | G06F 21/32 |
| | | | 726/7 |
| 2009/0217386 A1 | 8/2009 | Schneider | |
| 2014/0365775 A1 | 12/2014 | Yavuz et al. | |
| 2016/0072787 A1* | 3/2016 | Balabine | H04L 63/08 |
| | | | 726/6 |
| 2017/0346515 A1* | 11/2017 | Shayevitz | H04L 1/005 |

FOREIGN PATENT DOCUMENTS

| | | |
|---|---|---|
| EP | 1631037 A1 | 3/2006 |
| EP | 1635530 A1 | 3/2006 |

OTHER PUBLICATIONS

Gabrielsson, Andreas et al., "Analysis of the Client Puzzles protocol", KTH Computer Science and Communication, May 21, 2012, 1-18.

Juels, Ari et al., "Client Puzzles: A Cryptographic Countermeasure Against Connection Depletion Attacks", Proceedings of the Network and Distributed System Security Symposium, NDSS 1999, San Diego, California, Jan. 1999, 1-15.

Merkle, Ralph C., "Secure Communications Over Insecure Channels", Department of Electrical Engineering and Computer Sciences; University of California, Berkley, Apr. 1978, pp. 1-6.

Waters, Brent, et al., "New Client Puzzle Outsourcing Techniques for DoS Resistance", Washington, DC, USA, Oct. 25-29, 2004, pp. 1-11.

* cited by examiner

METHOD AND DEVICE FOR ESTABLISHING A COMPUTATIONAL PUZZLE FOR USE IN COMMUNICATION BETWEEN A CLIENT AND A SERVER

TECHNICAL FIELD

The technology disclosed herein relates generally to the field of data communication, and in particular to methods and means for establishing and solving computational puzzles.

BACKGROUND

When providing various forms of network service, such as network access or access to applications etc., there can be situations where a serving entity, e.g. a server, gets overloaded by receiving too many service requests more or less simultaneously. Such overload may also be caused by a so called denial-of-service (DoS) attack where malicious clients intentionally flood the service with a huge number of requests. At the initial request, before security has been established, i.e. before the client is authenticated, it is particularly hard to provide protection against overload attacks.

A mechanism known as "puzzles" is sometimes used for avoiding overload situations. The puzzle aims at causing small computational load on clients, thereby creating a period of idle time for the server from which the clients request service. The client must present a solution to the puzzle before being allowed to proceed. The puzzles are created in a computationally asymmetric fashion: it is easy for the server to create new puzzles, but somewhat difficult for the client to solve them.

FIG. 1 illustrates signaling for avoiding attacks, such as DoS or connection depletion attacks, aimed at exhausting computational resources as well as memory resources of a server S leading to overload. A predominant way to implement puzzles is via a cryptographic hash function, F. A client C sends an access request to the server S (arrow A1). In response, the server S chooses a value x and sends a puzzle $y=F(x)$ to the client C (arrow A2) asking the client C to find x. In other instances, the values x and y may have been pre-determined by the server S. If x and y are random or pseudorandom and m and n bits, respectively, in size, this requires on the order of $\min(2^m, 2^n)$ hash function computations for the client C, whereas it only requires one hash function computation for the server S to verify (arrow A4). Standard hash functions have input/output on the order of n and m=100 bits, which would be infeasible to solve. Therefore, the hash values are usually truncated, in the input and/or in the output. For example, the puzzle or the task could be to find x such $F(x)=p\|00\ldots0$ where p is allowed to be "anything", followed by n zeros. Prior art arrangements thus allow for tuning of the difficulty of puzzles by selecting parameters m and/or n, the difficulty of the puzzle thus being determined only by this parameter selection.

In some instances, the sending and receiving/verifying of puzzles may still create unnecessary overhead, i.e. waste resources in terms of bandwidth and computation processing and thus be inefficient, and improvements in view of preventing and controlling overload situations are needed.

SUMMARY

An objective of the present disclosure is to solve or at least alleviate at least one of the above mentioned problems.

The objective is according to an aspect achieved by a method for a serving device of establishing a computational puzzle for use in communication between a client device and the serving device. The method comprises establishing, in the serving device, the computational puzzle based on a key shared by the client device and the serving device and on a solution to the computational puzzle.

An advantage of the method is improved protection against overload situations by using a key for establishing the puzzle, wherein the key is available to both the server and at least some clients. By providing the key or parts of the key to e.g. trusted clients or prioritized clients, these clients are efficiently allowed to proceed further in the communication. At the same time, by making the solution very hard if not impossible to guess for clients not having the key, e.g. malicious clients, these clients are prevented entirely from proceeding further in the communication. Another advantage is that such malicious clients are prevented at an early stage, thus minimizing load caused on the serving device.

The objective is according to an aspect achieved by a computer program for a serving device for establishing a computational puzzle for use in communication between a client device and the serving device. The computer program comprises computer program code, which, when executed on at least one processor on the serving device causes the serving device to perform the method as above.

The objective is according to an aspect achieved by a computer program product comprising a computer program as above and a computer readable means on which the computer program is stored.

The objective is according to an aspect achieved by a serving device for establishing a computational puzzle for use in communication with a client device. The serving device is configured to establish the computational puzzle based on a key shared by the client device and the serving device and on a solution to the computational puzzle.

The objective is according to an aspect achieved by a method for a client device of solving a computational puzzle for use in communication between the client device and a serving device. The method comprises receiving, from the serving device, at least part of information defining a computational puzzle, and solving, in the client device, the computational puzzle by using a key shared by the client device and the serving device.

An advantage of the method is that legitimate client devices are able to get access swiftly, while client devices not having the key are prevented from obtaining access.

The objective is according to an aspect achieved by a computer program for a client device of solving a computational puzzle for use in communication between the client device and a serving device. The computer program comprises computer program code, which, when executed on at least one processor on the client device causes the client device to perform the method as above.

The objective is according to an aspect achieved by a computer program product comprising a computer program as above and a computer readable means on which the computer program is stored.

The objective is according to an aspect achieved by a client device for solving a computational puzzle for use in communication between the client device and a serving device. The client device is configured to receive, from the serving device, at least part of information defining a computational puzzle, and solve, in the client device, the computational puzzle by using a key shared by the client device and the serving device.

The objective is according to an aspect achieved by a method for a serving device of establishing a computational puzzle for use in communication between a client device and the serving device. The method comprises establishing the computational puzzle based on auxiliary information encoded in a second part of a solution of the computational puzzle and on the solution of the computational puzzle.

The objective is according to an aspect achieved by a computer program for a serving device for establishing a computational puzzle for use in communication between a client device and the serving device. The computer program comprises computer program code, which, when executed on at least one processor on the serving device causes the serving device to perform the method as above.

The objective is according to an aspect achieved by a computer program product comprising a computer program as above and a computer readable means on which the computer program is stored.

The objective is according to an aspect achieved by a method for a serving device of establishing a computational puzzle for use in communication between a client device and the serving device. The method comprises establishing the computational puzzle based on auxiliary information encoded in a second part of a solution of the computational puzzle and on the solution of the computational puzzle.

The method provides a protection against overload situations in an efficient way, by encoding auxiliary information into the solution. The increased efficiency motivates to a higher degree than in prior art the increased overhead caused by the use of puzzles. Another advantage of the method is that when the auxiliary information comprises information on which resources to use next, malicious client devices has no incentive to guess the solution, since any solution to the puzzle other than the intended one fails to convey the auxiliary information enabling the client device to proceed further.

The objective is according to an aspect achieved by a method for a client device of solving a computational puzzle for use in communication between the client device and a serving device. The method comprises receiving, from the serving device, at least part of information defining a computational puzzle, and decoding auxiliary information encoded in a second part of a solution of the computational puzzle as part of solving the computational puzzle.

The objective is according to an aspect achieved by a computer program for a client device for solving a computational puzzle for use in communication between the client device and a serving device. The computer program comprises computer program code, which, when executed on at least one processor on the client device causes the client device to perform the method as above.

The objective is according to an aspect achieved by a computer program product comprising a computer program as above and a computer readable means on which the computer program is stored.

The objective is according to an aspect achieved by a client device for solving a computational puzzle for use in communication between the client device and a serving device. The client device is configured to receive, from the serving device, at least part of information defining a computational puzzle, and decode auxiliary information encoded in a second part of a solution of the computational puzzle as part of solving the computational puzzle.

Further features and advantages of the present disclosure will become clear upon reading the following description and the accompanying drawings.

DETAILED DESCRIPTION

Figure 1:
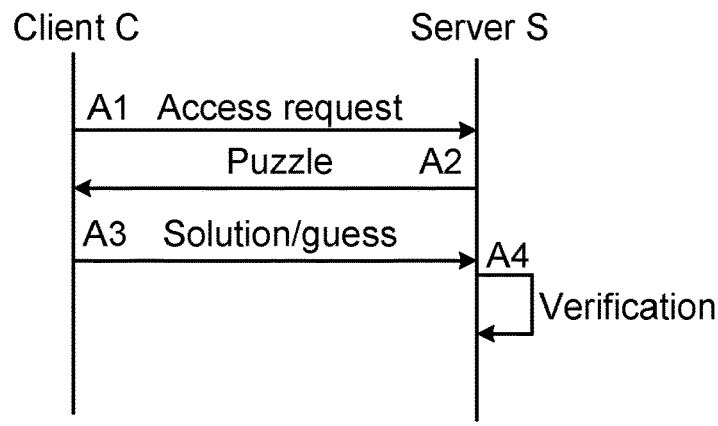
FIG. 1 illustrates signaling for avoiding overloading a server according to prior art.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
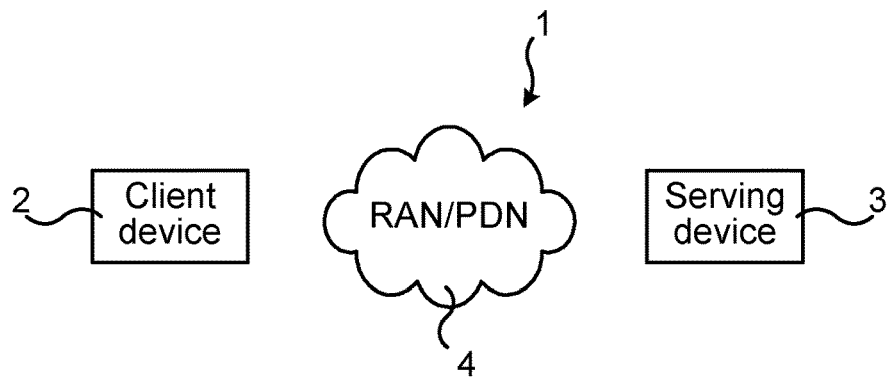
FIG. 2 illustrates schematically an environment in which embodiments of the present disclosure may be implemented.

FIG. 2 illustrates schematically an environment in which embodiments of the present disclosure may be implemented. A communication system 1 comprises a number of client devices 2 and serving devices 3 (also denoted simply server in the following), which may communicate using an access network 4. The access network 4 may for instance comprise a radio access network (RAN), in which case the client 4 may comprise e.g. a mobile terminal or user equipment (UE), and the serving device may comprise a radio access node, e.g. a base station or access point. As another example, the access network 4 may comprise a (wired) computer network, a packet data network (PDN), in which case the client device 2 may comprise a personal computer, laptop or the like and the serving device 3 may comprise a server comprising e.g. applications and providing web services or other services. It is noted that the access network 4 may comprise both a wired packet data network, such as the Internet, and also a RAN, such as a 4G network.

The inventors behind the present teachings have pinpointed at least two aspects of computational puzzles (also denoted puzzles herein):

1. In many situations it would be advantageous to make the puzzle easier to solve for a certain category of client devices, e.g. prioritized clients.

2. To motivate the added overhead created by signaling related to solving and verifying the puzzles, it would be advantageous to assign a "semantic meaning" to the puzzle solution. This is in contrast to known puzzle-based mechanisms, which do not use the puzzle solutions for any other purpose than proving that the correct solution has been obtained. In other words, in prior art, the puzzle solution is discarded and not used for any other purpose after it has been verified.

Considering first point 1: assuming that there are two categories of clients, category A and B, wherein client devices (also denoted clients in the following) of category A should have an easier task of solving the puzzles than category B clients, for instance using $2^{nA}$ operations, while clients in category B should have complexity $2^{nB}$ operations in solving the puzzles, wherein nA<nB. Puzzles could be created with such corresponding difficulty by simply selecting n to be equal to nA or nB in prior art hash-based puzzles. However, recalling that the typical situation is that the client is not yet authenticated, a client from category B could thus simply claim to belong to the category A and would be given a "too easy" puzzle. This would be detected later, but then it would be too late since the desired offloading of the server would not have been achieved.

Considering next the second point: assuming for instance that a 64 bit parameter should be encoded in the puzzle solution x. This parameter is, according to an example of the present teachings, to be used in the service or communication following the initial access request in order to motivate the added overhead. This means that x is at least 64 bits in size, i.e. m is at least 64 bits, most likely making the puzzle infeasible to solve in a reasonable time. One difficulty is thus that the encoding of auxiliary information into the solution x has an impact also on the puzzle's difficulty. In different aspects, the present teachings provide means for controlling the difficulty of the puzzle independently of the number of encoded auxiliary bits.

The present teachings provide, in view of at least these aspects, valuable solutions to the above issues and improvements to the field of computational puzzles.

Briefly, the teachings propose to use tunable puzzles, in the sense that a legitimate client device is assumed to have a secret key. That is, instead of using the known puzzles of form y=F(x), where x is the solution, it is proposed to use puzzles of form y=F (key||x', x") where x=(x', x") is a solution to the puzzle and x" encodes auxiliary information. The difficulty of solving the puzzle depends on the number of bits in x' but is independent on the number of bits in x". The puzzle is thereby tunable by e.g. setting the number of bits of x'. For clients not knowing the key, the difficulty is at least min($2^n$, $2^k$), where k is the number of bits in the key.

The key may be known only by client devices belonging to a certain category, e.g. a prioritized category. Alternatively, part of the key may be fixed, known or made available by the serving device and may then be used to create puzzles for devices outside a prioritized category. The bit-length of x' may be different for puzzles associated with prioritized and non-prioritized devices. In a preferred embodiment, the function F is based on a block cipher such as Advanced Encryption Standard (AES).

In the following, various aspects of computational puzzles according to the present teachings are described more in detail.

A puzzle is in the following represented as a bit string p of length n, the solution to the puzzle as a bit string s of length m, such that F(s)=p, where F is a function with certain properties. Some basic requirements may be:

It should be easy for the serving device 3 (or other entity in the communication system 1) to generate puzzle p, or feasible to pre-calculate the puzzle p. This since the creation of the puzzles as such should not create unnecessary load on the serving device 3.

The function F should be possible to compute easily but hard to invert, F may for instance be a one-way function.

As a simple example, F is a cryptographic hash. Then p=F(s) is a puzzle with solution s. To make it possible to solve the puzzle, the length of s should be limited to allow exhaustive search in reasonable time. To manage the relations between the number of bits in the input and output relative to the desired "difficulty" of the puzzles, the input and output can, as in prior art, be padded with bit strings a and b:

$$a\|p=F(b\|s)$$

where "||" denotes concatenation, i.e. the operation of joining the bit strings end-to-end.

The numbers a and b may be fixed, e.g. a constant defined in a standard (e.g. a=000 . . . 0), or specified by the standard to have a certain value.

It is noted that the function F is typically not 1-1, wherein one puzzle has only one solution. Several (b, s) values could thus give the same (a, p) output. In puzzles according to prior art, this would be acceptable as any solution is considered admissible due to the fact that the solution is not used after it has been verified. According to aspects of the present teachings, this is not desirable, and in various embodiments auxiliary information is to be encoded in the solution and this information has a "semantic meaning". Finding a wrong solution (i.e. not the intended one) means that the client device 2 gets the wrong semantic information. By designing the puzzle appropriately, the probability that a wrong solution is found can be controlled (as is described later). The auxiliary information may for instance comprise information enabling the client device to proceed further in the communication. That is, the serving device 3 sends a puzzle to the client device 2, which solves the puzzle and thereby decodes the auxiliary information, which may for instance comprise information on which communication resources to use next, or certain parameter(s) to use. Hence, the client device 2 that has solved the puzzle may then proceed, while a client device (e.g. a device used in a DoS attack) that is not able to solve the puzzle is efficiently hindered from proceeding further.

In the following, a tunable puzzle function is described. A secure symmetric key encryption algorithm, such as the AES, is considered, which takes a key of length n and a message of length m and transforms them into a cipher text of length m.

$$AES(key, message)=cipher\ text.$$

For AES, k=128, 192, and 256-bit key sizes are specified. An "AES key" may be distinct from the key associated to the puzzle p, and therefore "AES key" and "puzzle key" are used in the following when required to avoid confusion. Given the AES key, the inverse of AES is straightforward to calculate; this is the decryption algorithm, which is well-defined. It is however noted that considered as a function of the puzzle key, the above function is not 1-1 and thus behaves like a hash function. That is, for given M, $F_M(x)$ =AES(x, M) can be viewed as a hash function. Hence, to create a puzzle p, the whole AES key cannot be revealed since those clients knowing the AES key will hardly need to perform any computations at all, just a single AES computation. On the other hand, in order to make the puzzle p possible to solve in a reasonable time, the whole AES key cannot be completely unknown either. For reducing the effective puzzle key size to t bits, t<k, the AES key may be defined to have e.g. k-t initial zeros and the remaining t bits are denoted by s' (this is thus an example of the aforementioned padding with b=0 0 0 . . . 0). One potential puzzle function is $$F(s')=AES(000 \ldots 0s', 000 \ldots 0)=a\|p$$

That is, any t bits s' such that a‖p decrypts to 000 . . . 0 with the AES key 000 . . . 0s' is a solution. As discussed earlier, F(s') can be viewed as (non 1-1) hash function with potentially many solutions to the same puzzle p. It is noted that a puzzle p is easy to generate efficiently, it is just performing encryption of all zeros using the selected AES key 000 . . . 0s'.

There are several ways to handle the multiple solutions. For instance, if it is easy to generate, e.g., the lexicographically lowest solution, s', then that lexicographically lowest solution, s', could be defined to be the canonical solution (unique solution) whereby the potential problem with multiple solutions is avoided. In other cases another order could be used to define the canonical solution, e.g. the lexicographically highest solution. For example, if puzzles are based on a modular arithmetic function (modulo p) the canonical solution may be defined as having specific properties, in particular number theoretic properties, e.g. belonging to an interval or being a quadratic residue, . . . , etc.

There are however difficulties in trying to define canonical solutions. For example, when considering "lexicographically lowest solution"; for any solution s1 there may be an even smaller solution s2<s1, and the only way to find out would be exhaustive search, which would put a burden on the party generating the puzzle, contrary to the aim of avoiding additional load. Therefore, in various aspects of the present teachings, a unique solution to the puzzle is not required but will instead make the probability of plural solutions low (as described later).

Figure 3:
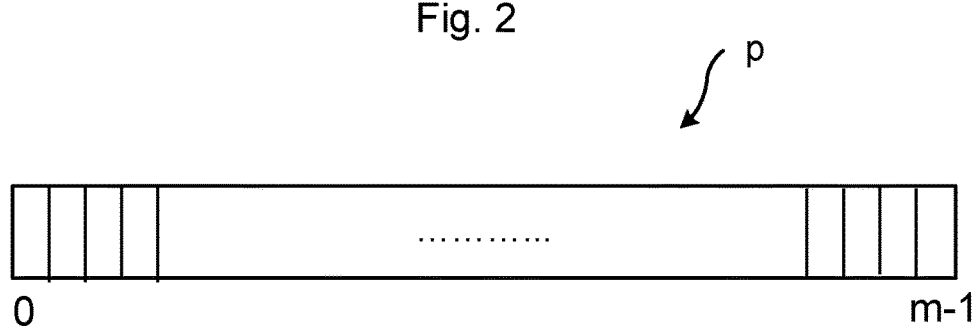
FIG. 3 exemplifies a puzzle and solution according to the present teachings.
Figure 3:
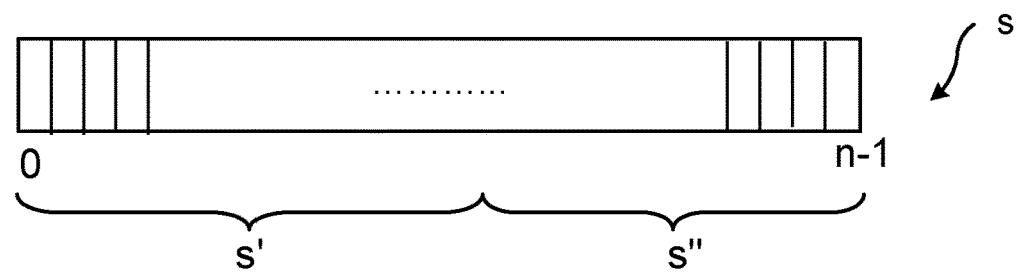

Before analyzing probability of multiple solutions, some further generalization is made. In order to allow auxiliary information, some degrees of freedom should be left in the decryption value for enabling encoding of this "hidden" information. This can be achieved by considering the following more general puzzle formulation $$F(s', s'')=AES(000 \ldots 0s', 0\ 0\ 0 \ldots 0s'')=p (*)$$

where puzzle p is n bits, s' is t bits, and s'' is u bits, and there are m-u preceding zeros before s''. The solution to this puzzle p is any t bits s' and u bits s'' such that p decrypts to 000 . . . 0s'' with the selected AES key 000 . . . 0s'. The solution to the puzzle p is the v:=t+u bit solution s:=s'‖s'' which is chosen by the serving device 3 (or other entity in the communication system 1) so that relevant auxiliary information is encoded, and then inserted into AES of equation (*) to generate the puzzle p. FIG. 3 exemplifies the puzzle p (uppermost part of figure) and solution s (lowermost part of figure).

It is noted that the auxiliary information can be given as input to the puzzle generation, if and as desired. The auxiliary information may be chosen by the serving device rather than be computed "backwards" from the puzzle, i.e. the auxiliary information may be selected in any desired way. As a particular example: supposing the puzzle solution should encode a Uniform Resource Locator (URL) to which the client should direct a subsequent request for streaming some content such as a movie or music file. For example, URL="www.example.com". To this end, the serving device may for example choose a suitable representation of the URL as a binary string s'' constituting the auxiliary information, e.g. s'' may simply be the sequence of ASCII characters of the URL. Next, the serving device adjoins a suitable b''. As noted, b'' could be a fixed binary pattern such as "00 . . . 0", and the binary string b''‖s'' will be used as one of two parameters to create the puzzle. Next, a second input parameter defining the puzzle, denoted b'‖s', is constructed. This parameter may be made dependent on the key. Depending on the category of client device, the serving device may either choose b'‖s' as a key known only to certain devices, or the serving device may choose b' as a fixed or publicly known string, b'=00 . . . 0 (with a suitable number of zeros to control puzzle difficulty), and may then assign s' randomly. In any case, the final puzzle is defined by: y=F(b'‖s', b''‖s'') (or parts of the bits in y, see below) where F may be based on AES. It is noted that since the auxiliary information s'' is used as an input to the puzzle creation, it poses no problem for the serving device to create a corresponding puzzle. This would have been more problematic if the serving device had first chosen y and then attempted to construct input parameters which encodes the desired auxiliary information.

As another example, supposing the auxiliary information should encode a password. This can be done by encoding the password as a binary string s'', and follow the same procedure as above.

More generally, the following puzzle is considered:

$$AES(b'\|s', b''\|s'')=a\|p (**)$$

where a, b', b'' are known bit strings, the puzzle p is given and s=s'‖s'' is the solution. Any of the bit strings may potentially be empty (though not all at the same time).

Considering the equation (**), a key of the puzzle function is a subset of b' (or the entire b') which is secret, and may be known only by the client devices 2 of a special category and by the serving device 3 (and communication system 1). It is noted that while the "AES key" corresponds to the entire first parameter b'‖s', the "puzzle key" is determined by b' (or a subset thereof). It is also noted that if s' is a short string (i.e. so that b' is almost the entire AES key) or even empty, then there is very little computational effort required to calculate s''. If the tunable puzzle p is used to give priority to client devices 2 which have the puzzle key, there may be no need to require a computational effort from these client devices 2. In these cases, it is not computationally feasible for anyone to guess neither the AES key nor the puzzle key by trial and error, so other client devices will be effectively down-prioritized.

Now, reverting to the question of the uniqueness of the solution, the following statistical/heuristic argument is made assuming that AES (or any hash function) behaves randomly. The number of different solutions s' is $2^t$ and the probability that any value p (or a‖p in the more general setting of (**)) decrypts under a random key to any other value s can be assumed to be $\frac{1}{2}^m$ (or $\frac{1}{2}^n$; it is noted that for an encryption function such as AES, the sizes of all a‖p and b''‖s'' must be the same, i.e. m=n, so $\frac{1}{2}^m=\frac{1}{2}^n$.

Hence for any fixed x, the expected value of the number of collisions, i.e. the expected number of pairs $(s_1', s_2')$ such that AES $(b'\|s_1', x)$=AES $(b'\|s_2', x)$ is approximately $$E(\# \text{ collision-pairs}) \sim 2^{2v-m}$$

If auxiliary bits, s'', are also considered, u more bits degrees of freedom are obtained in the choice of x above. Recalling that v=t+u denoted the number of bits in the solution s=s'+s'', the expected number of collisions becomes about $$E(\# \text{ collision-pairs}) \sim 2^{2v-m}$$

In order to avoid collisions, this should be much smaller than 1, preferably negligible, for instance $<2^{-40}$. This can be solved for v, resulting in:

$v=(m-40)/2 \sim 44$ for $m=128$ ($n=m=128$ applies for AES).

This is thus also a boundary on the probability that the client devices find an incorrect solution and thereby obtain incorrect auxiliary information.

However it should be verified that the puzzle has not been made "too easy", i.e. that u can still be made large enough: for instance, $t \sim 16$ bits gives $0 < u < 28$ which is the span for the number of bits in the auxiliary information in this case.

It is also noted that, given the desired collision probability $\varepsilon$, it is possible to deduce a lower bound on the parameter m, $m > \log_2(\varepsilon^{-1})$.

The creating of special tunable puzzles for prioritized devices has now been described and also the encoding of additional (useful) information in puzzle solutions without increasing difficulty of solving puzzles.

These two aspects may be provided separately or in combination. There are many use cases where this functionality is valuable. In any system, if the system load is high one would like to give access to prioritized users without first identifying the users, since identifying in itself adds load.

As an example of using the second property of encoding additional information (auxiliary information) into the solution: the solution to the puzzle may be some additional security information or other information. For instance, the solution to the puzzle may be a one-time password that the client uses as an additional authentication factor. As another example, the solution may be a nonce, from which a legitimate client could derive a key used in some security protocol. Alternatively, the solution may contain information related to some request-associated service, for example a Uniform Resource Identifier (URI), Fully Qualified Domain Name (FQDN) or Internet Protocol (IP) address that the client may use. The auxiliary information may also describe a network resource/communication resource to use for the following communication.

Using a puzzle wherein a key shared between the client device and the serving device is used, enables delayed responses for the client devices that possess the key (by tuning the difficulty), and also enables control of access from the client devices that do not have the key (again, by tuning the difficulty, in particular lowering it).

The solution to the puzzle may serve as a "session key". This allows for a co-existence of access requesting "shared key" holders and non-key holders. The shared-key holders may solve the puzzle easily by decrypting the "session key" using the "shared key" whereas the non-key holders would require more time. However, both categories (shared key holders and non-key holders, respectively) would obtain the "session key" which could be used for gaining access to the communication system 1 and/or access to a service.

Figure 4:
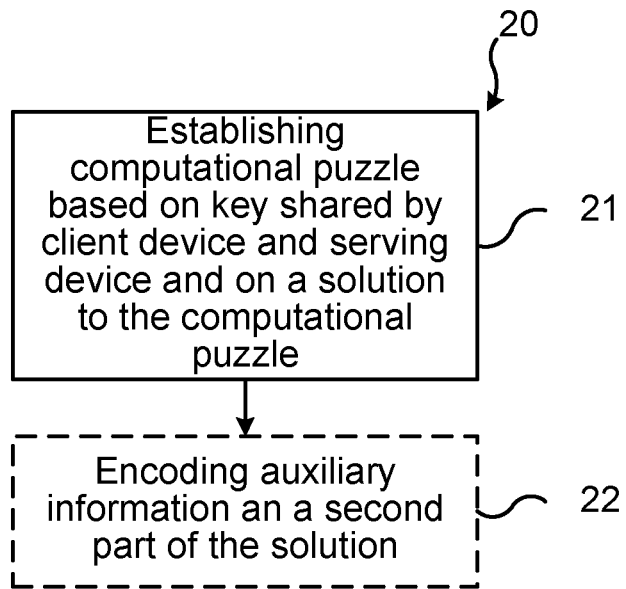
FIG. 4 illustrates a flow chart over steps of an embodiment of a method in a serving device in accordance with the present teachings.

The features and embodiments of the present teachings that have been described may be combined in different ways, examples of which are given in the following, with reference first to FIG. 4. FIG. 4 illustrates a flow chart over steps of an embodiment of a method in a serving device in accordance with the present teachings.

A method 20 for a serving device 3 of establishing a computational puzzle for use in communication between a client device 2 and the serving device 3 is provided. The method 20 comprises establishing 21, in the serving device 3, the computational puzzle p based on a key shared by the client device 2 and the serving device 3 and on a solution s', s" to the computational puzzle p.

The computational puzzle p is thus based on a key and on a solution s to the puzzle p, e.g. p=F (key, s), e.g. p=F (key∥s). The solution s may comprise a first part s' and a second part s", i.e. s=(s', s"). A legitimate client device 2 has the key, and thus part of the solution s and may solve the puzzle easier than a client device not having the key.

The method 20 provides several improvements for preventing overload and connection depletion situations. The feature of basing the puzzle on a key shared by the client device 2 and the serving device 3 provides an advantage in that client devices that do not have the key are prevented from solving the puzzle in a feasible amount of time. Thereby puzzles may be created that are virtually unsolvable by unauthorized devices, i.e. client devices not having the key. In contrast to prior art, the serving device will thereby not be occupied by verifying solutions to puzzles.

In some embodiments, different puzzles may be sent to different client devices. A first and a second category of client devices may send different types of access requests, and the serving device may select puzzle based on the type of access request received. For instance, a client device using e.g. a first preamble may belong to a prioritized category of client devices and may receive a first type of puzzle, while another client device, belonging to a non-prioritized category of client devices, uses a second preamble and receives a second type of puzzle. The serving device 3 may, upon receiving the first preamble, establish a first type of puzzle, which may have fewer bits in the first part s' of the solution than a puzzle of the second type. The puzzles may thus be tuned in dependence on client device, i.e. tuned to different levels of difficulty to solve the puzzle for different client devices.

In an embodiment, the establishing 21 further comprises encoding 22, by the serving device 3, auxiliary information in a second part s" of the solution s', s". In FIG. 4, this step 22 is illustrated by a box drawn with dashed lines, thereby indicating that the step is optional. An advantage of this embodiment is that the overhead incurred by the use of puzzles is used in an improved and more efficient way. The auxiliary information may for instance provide the client device with information on how to proceed further in the communication, e.g. by pointing at certain resources to use, or providing parameters needed for next messaging. The denotation "auxiliary information" may be interpreted as information in addition to the solution. That is, a first part of the solution s' has no semantic meaning, but is only part of the solution, while the second part of the solution s" also has a sematic meaning, e.g. reveals which resources to use next for further communication with the serving device 3. A solution which is not the intended solution fails to convey the second information, and the client device is prevented from further communication with the serving device 3. As described earlier, the "semantic meaning" assigned to the puzzle solution by the auxiliary information is in contrast to known puzzle-based mechanisms, which use the puzzle solutions only for proving that the correct solution has been obtained.

In various embodiments thus, the auxiliary information comprises one or more of: information about resources to use for a subsequent message between the client device 2 and the serving device 3, security information, a password for use in an authentication procedure, and a nonce from which a security key can be derived. In some embodiments, the security key might be derivable only be client devices 2 belonging to a certain category of devices, e.g. prioritized devices or trusted devices.

In an embodiment, the method 20 comprises adapting level of difficulty of solving the computational puzzle by setting number of bits in at least one of: the computational puzzle p, a first part s' of the solution and a second part s" of the solution accordingly. The number of bits of the computational puzzle p may for instance be varied, as can any part of the solution.

In an embodiment, the method 20 comprises adapting level of difficulty of solving the computational puzzle by setting number of bits of the key accordingly.

In an embodiment, the adapting comprises increasing the level of difficulty upon establishing that a load threshold has been reached in the serving device 3. This embodiment gives a way of preventing overload by adapting the level of difficulty according to load of the serving device 3. If the load approaches a threshold value indicating imminent overload of e.g. processing capacity, the difficulty may be increased (e.g. by increasing number of bits of the solution), while at times when the serving device 3 is less loaded, the difficulty may be lowered, so that client devices 2 more easily solves the puzzle.

In various embodiments, at least part of the key is preconfigured in the client device 2 or has been provided to the client device 2 in prior communication. The serving device 3 may be arranged to configure certain client devices with the key or parts thereof, or the key may have been given in an earlier communication exchange between the client device 2 and the serving device 3, e.g. during a previous communication protected by encryption so that the key would not become available to non-authorized entities.

Figure 5:
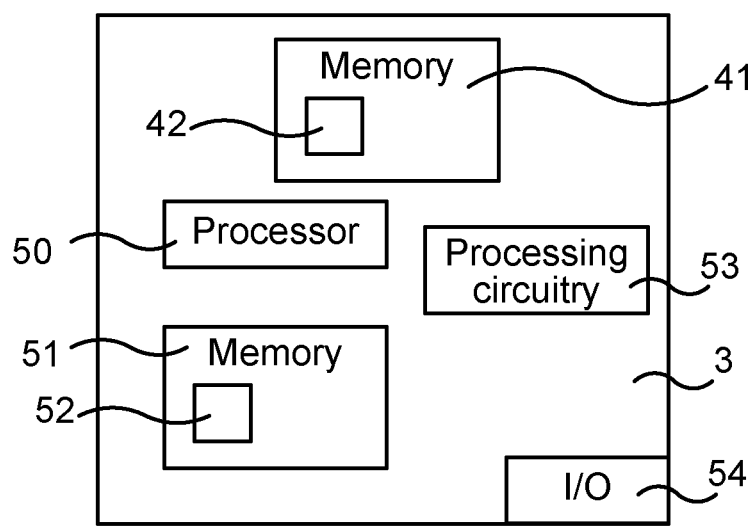
FIG. 5 illustrates schematically a serving device and means for implementing embodiments of the present teachings.

FIG. 5 illustrates schematically a serving device and means for implementing embodiments of the present teachings. The various embodiments of the method 20 as described e.g. in relation to FIG. 4 may be implemented e.g. in a wired network, e.g. in a server of a packet data network (e.g. Internet), to which access is requested by client devices 2. Embodiments of the method 20 may also be implemented in a radio access node such as an eNB.

The serving device 3 comprises a processor 50 comprising any combination of one or more of a central processing unit (CPU), multiprocessor, microcontroller, digital signal processor (DSP), application specific integrated circuit etc. capable of executing software instructions stored in a memory 51 which can thus be a computer program product 51. The processor 50 can be configured to execute any of the various embodiments of the method for instance as described in relation to FIG. 4.

The memory 51 can be any combination of read and write memory (RAM) and read only memory (ROM), Flash memory, magnetic tape, Compact Disc (CD)-ROM, digital versatile disc (DVD), Blu-ray disc etc. The memory 61 also comprises persistent storage, which, for example, can be any single one or combination of magnetic memory, optical memory, solid state memory or even remotely mounted memory.

The serving device 3 may also comprise processing circuitry 53, comprising e.g. computer circuitry, such as one or more microprocessor-based circuits, DSP-based circuits, FPGA-based circuits, ASIC-based circuits, or other digital processing circuitry for implementing various steps of the method. Such circuitry may comprise fixed processing circuitry or programmed processing circuitry, or a mix of both fixed and programmed processing circuitry.

The serving device 3 may also comprise an input/output device 54 (indicated by I/O in FIG. 5) for communicating with other entities. Such input/output device 54 may for instance comprise a communication interface, antenna system and/or a wired connection to other serving devices and network nodes.

The present teachings provide computer programs 52 for the serving device 3. The computer program 52 comprises computer program code, which, when executed on at least one processor 50 on the serving device 3 causes the serving device 3 to perform the method 20 according to any of the described embodiments thereof.

The present disclosure also encompasses computer program products 51 comprising a computer program 52 for implementing the embodiments of the method as described, and a computer readable means on which the computer program 52 is stored.

A serving device 3 for establishing a computational puzzle for use in communication with a client device 2 is provided. The serving device 3 is configured to establish the computational puzzle p based on a key shared by the client device 2 and the serving device 3 and on a solution s', s" to the computational puzzle p. The computational puzzle p may for instance be established by the serving device 3 creating it, or by the serving device 3 receiving the puzzle p from e.g. another device or by the serving device 3 requesting the puzzle p from a device creating the puzzle p.

The serving device 3 may be configured to perform the above steps e.g. by comprising a processor 50 and memory 51, the memory 51 containing instructions executable by the processor 50, whereby the serving device 3 is operative to perform the steps.

In an embodiment, the serving device 3 is configured to establish by further encoding auxiliary information in a second part s" of the solution s', s".

In various embodiments, the auxiliary information comprises one or more of: information about resources to use for a subsequent message between the client device 2 and the serving device 3, security information, a password for use in an authentication procedure, and a nonce from which a security key can be derived.

In an embodiment, the serving device 3 is configured to adapt level of difficulty of solving the computational puzzle by setting number of bits in at least one of: the computational puzzle p, a first part s' of the solution and a second part s" of the solution accordingly.

In an embodiment, the serving device 3 is configured to adapt level of difficulty of solving the computational puzzle by setting number of bits of the key accordingly.

In an embodiment, the serving device 3 is configured to adapt by increasing the level of difficulty upon establishing that a load threshold has been reached in the serving device 3.

In an embodiment, the serving device 3 is configured to provide at least part of the key to the client device 2. The key may be provided e.g. in a configuration message sent to the client device 2 or may have been provided in prior communication between the client device 2 and the serving device 3. In some embodiments, at least parts of the key may be publicly known, e.g. broadcast by the serving device 3.

The computer program products, or the memories, comprises instructions executable by the processor 50. Such instructions may be comprised in a computer program, or in one or more software modules or function modules.

In an aspect, means are provided, e.g. function modules, that can be implemented using software instructions such as computer program executing in a processor and/or using hardware, such as application specific integrated circuits, field programmable gate arrays, discrete logical components etc., or any combination thereof.

In particular, a serving device for establishing a computational puzzle for use in communication with a client device is provided. The serving device comprises first means for establishing the computational puzzle based on a key shared by the client device and the serving device and on a solution to the computational puzzle. The first means may for instance comprise processing circuitry adapted to establish the computational puzzle based on a key and on a solution to the computational puzzle using program code stored in a memory. The first means may for instance comprise processing circuitry 53 described with reference to FIG. 5.

The serving device may comprise yet additional means for implementing any of the features and steps of the embodiments that have been described. For instance, the serving device may comprise means for establishing by further encoding auxiliary information in a second part of the solution. Such means may for instance comprise processing circuitry adapted to establish by encoding auxiliary information using program code stored in a memory.

Figure 6:
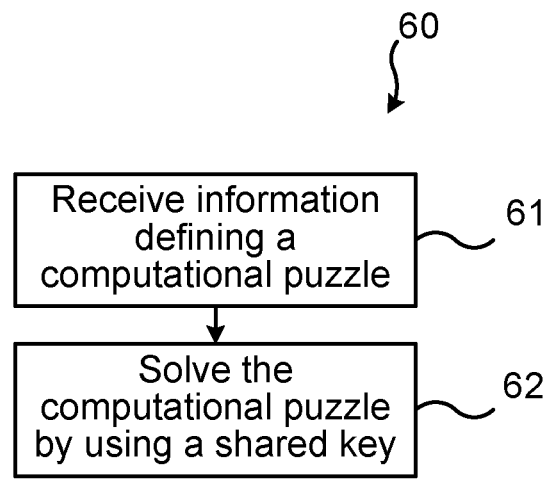
FIG. 6 illustrates a flow chart over steps of an embodiment of a method in client device in accordance with the present teachings.

The features and embodiments of the present teachings that have been described may be combined in different ways, examples of which are given in the following, with reference next to FIG. 6. FIG. 6 illustrates a flow chart over steps of an embodiment of a method in client device in accordance with the present teachings.

A method 60 for a client device 2 of solving a computational puzzle for use in communication between the client device 2 and a serving device 3. The method 60 comprises:
  receiving 61, from the serving device 3, at least part of information defining a computational puzzle,
  solving 62, in the client device 2, the computational puzzle by using a key shared by the client device 2 and the serving device 3.

If the client device 2 has a key it is able to solve the computational puzzle when having received the information defining the computational puzzle, or at least parts thereof. Client devices 2 not having the key will typically not be able to solve the computational puzzle, which prevents them from adding to the load of the serving device 3.

In an embodiment, the solving 62 further comprises decoding 63 auxiliary information encoded in a second part s'' of the solution s', s''.

In various embodiments, the auxiliary information comprises one or more of: information about resources to use in a subsequent message, security information, a password for use in an authentication procedure, and a nonce from which a security key can be derived by a first category of client devices 2, and the method 60 comprises using the auxiliary information for proceeding further in the communication.

Figure 7:
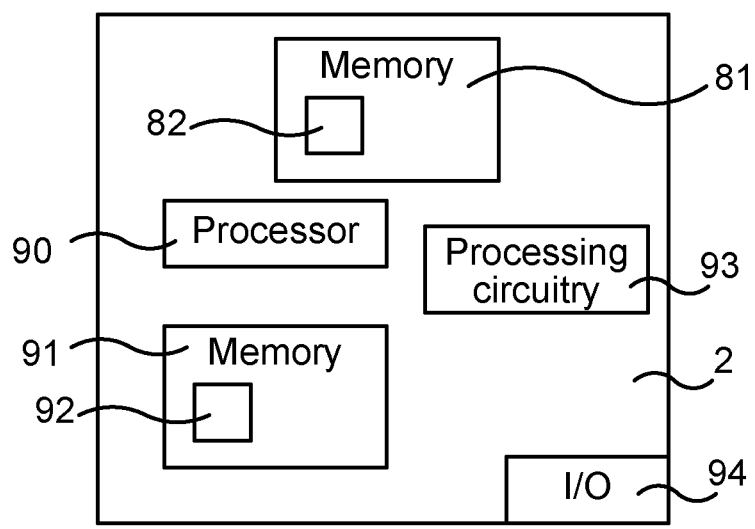
FIG. 7 illustrates schematically a client device and means for implementing embodiments of the present teachings.

FIG. 7 illustrates schematically a client device and means for implementing embodiments of the present teachings. The various embodiments of the method 60 as described e.g. in relation to FIG. 6 may be implemented e.g. in a wired network, e.g. in a server of a packet data network (e.g. Internet), to which access is requested by client devices 2. Embodiments of the method 60 may also be implemented in a radio access node such as an eNB.

The client device 2 comprises a processor 90 comprising any combination of one or more of a central processing unit (CPU), multiprocessor, microcontroller, digital signal processor (DSP), application specific integrated circuit etc. capable of executing software instructions stored in a memory 81 which can thus be a computer program product 81. The processor 90 can be configured to execute any of the various embodiments of the method for instance as described in relation to FIG. 6.

The memory 81 can be any combination of read and write memory (RAM) and read only memory (ROM), Flash memory, magnetic tape, Compact Disc (CD)-ROM, digital versatile disc (DVD), Blu-ray disc etc. The memory 61 also comprises persistent storage, which, for example, can be any single one or combination of magnetic memory, optical memory, solid state memory or even remotely mounted memory.

The client device 2 may also comprise processing circuitry 93, comprising e.g. computer circuitry, such as one or more microprocessor-based circuits, DSP-based circuits, FPGA-based circuits, ASIC-based circuits, or other digital processing circuitry for implementing various steps of the method. Such circuitry may comprise fixed processing circuitry or programmed processing circuitry, or a mix of both fixed and programmed processing circuitry.

The client device 2 may also comprise an input/output device 94 (indicated by I/O in FIG. 7) for communicating with other entities. Such input/output device 94 may for instance comprise a communication interface, antenna system and/or a wired connection to other serving devices and network nodes.

The present teachings provide computer programs 82 for the client device 2. The computer program 82 comprises computer program code, which, when executed on at least one processor 90 on the client device 2 causes the client device 2 to perform the method 60 according to any of the described embodiments thereof.

The present disclosure also encompasses computer program products 51 comprising a computer program 82 for implementing the embodiments of the method as described, and a computer readable means on which the computer program 82 is stored.

A client device 2 is provided for solving a computational puzzle for use in communication between the client device 2 and a serving device 3. The client device 2 is configured to:
  receive, from the serving device 3, at least part of information defining a computational puzzle,
  solve, in the client device 2, the computational puzzle by using a key shared by the client device 2 and the serving device 3.

The client device 2 may be configured to perform the above steps e.g. by comprising a processor 90 and memory 81, the memory 81 containing instructions executable by the processor 90, whereby the client device 2 is operative to perform the steps.

In an embodiment, the client device 2 is configured to solve by further decoding auxiliary information encoded in a second part s'' of the solution s', s''.

In various embodiments, the auxiliary information comprises one or more of: information about resources to use in a subsequent message, security information, a password for use in an authentication procedure, and a nonce from which a security key can be derived by a first category of client devices 2, and wherein the method 60 comprises using the auxiliary information for proceeding further in the communication.

The computer program products, or the memories, comprises instructions executable by the processor 90. Such instructions may be comprised in a computer program, or in one or more software modules or function modules.

In an aspect, means are provided, e.g. function modules, that can be implemented using software instructions such as computer program executing in a processor and/or using hardware, such as application specific integrated circuits, field programmable gate arrays, discrete logical components etc., or any combination thereof.

In particular, a client device provided for solving a computational puzzle for use in communication between the client device and a serving device is provided. The client device comprises first means for receiving, from the serving device, at least part of information defining a computational puzzle. The first means may for instance comprise receiving circuitry, antenna devices, interfaces and/or processing circuitry for reception of data. The first means may for instance comprise the input/output device 94 described with reference to FIG. 7.

The client device comprises second means for solving the computational puzzle by using a key shared by the client device and the serving device. The second means may for instance comprise processing circuitry adapted for solving puzzles using program code of a memory.

The client device may comprise yet additional means for implementing any of the features and steps of the embodiments that have been described.

Figure 8:
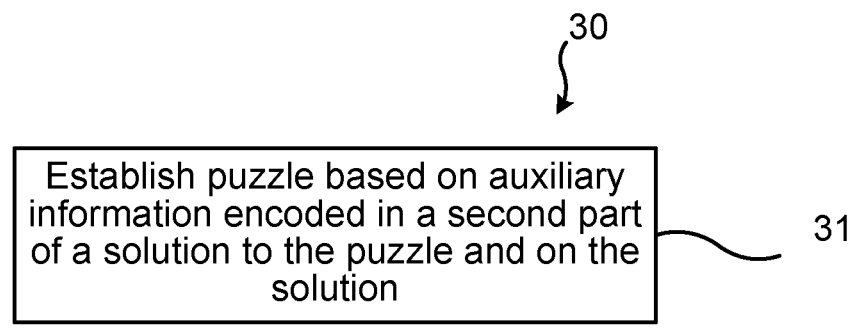
FIG. 8 illustrates a flow chart over steps of an embodiment of a method in a serving device in accordance with the present teachings.

FIG. 8 illustrates a flow chart over steps of an embodiment of a method in a serving device in accordance with the present teachings.

A method 30 for a serving device 3 of establishing a computational puzzle for use in communication between a client device 2 and the serving device 3 is provided. The method 30 comprises establishing 31 the computational puzzle based on auxiliary information encoded in a second part s″ of a solution s′, s″ of the computational puzzle and on the solution s′, s″ of the computational puzzle. The establishing 31 may comprise the serving device 3 creating the puzzle, e.g. in response to receiving an access request, or the establishing may comprise the serving device 3 receiving or requesting the computational puzzle from another node or device.

The method 30 of encoding auxiliary information in a part of the solution s′, s″ alleviates the disadvantage of overhead being introduced by sending the puzzle. In particular, by the added information, which may be used e.g. for enabling the client device 2 to perform a next step of the communication, the overhead is used for also another purpose than simply sending the puzzle. The auxiliary information (added information) may for instance comprise information enabling it to send a subsequent message by virtue of being informed about which communication resources to use, or by being informed about certain parameters needed in the subsequent signaling.

In an embodiment, the establishing 31 is further based on a key shared by the client device 2 and the serving device 3.

In various embodiments, the auxiliary information comprises one or more of: information about resources to use in a subsequent message, security information, a password for use in an authentication procedure, and a nonce from which a security key can be derived.

In an embodiment, the method 30 comprises adapting level of difficulty of solving the computational puzzle by setting number of bits of at least one of: the computational puzzle p, a first part s′ of the solution and a second part s″ of the solution accordingly.

In an embodiment, the method 30 comprises adapting level of difficulty of solving the computational puzzle by setting number of bits of the key accordingly.

In a variation of the above embodiment, the adapting comprises increasing the level of difficulty upon establishing that a load threshold has been reached in the serving device 3.

In an embodiment, the at least part of the key is preconfigured in the client device 2 or has been provided to the client device 2 in prior communication.

With reference again to FIG. 5, a serving device 3 for establishing a computational puzzle for use in communication between a client device 2 and the serving device 3 is provided. The serving device 3 is configured to establish the computational puzzle based on auxiliary information encoded in a second part s″ of a solution s′, s″ of the computational puzzle and on the solution s′, s″ of the computational puzzle.

In an embodiment, the serving device 3 is configured to establish further based on a key shared by the client device 2 and the serving device 3.

In various embodiments, the auxiliary information comprises one or more of: information about resources to use in a subsequent message, security information, a password for use in an authentication procedure, and a nonce from which a security key can be derived.

In various embodiments, the serving device 3 is configured to adapt level of difficulty of solving the computational puzzle by setting number of bits of at least one of: the computational puzzle p, a first part s′ of the solution and a second part s″ of the solution accordingly.

In an embodiment, the serving device 3 is configured to adapt level of difficulty of solving the computational puzzle by setting number of bits of the key accordingly.

In an embodiment, the serving device 3 is configured to adapt by increasing the level of difficulty upon establishing that a load threshold has been reached in the serving device 3.

In an embodiment, the serving device 3 is configured to provide the client device 2 with at least part of the key.

The present teachings provide computer programs 52 for the serving device 3. The computer program 22 comprises computer program code, which, when executed on at least one processor 50 on the serving device 3 causes the serving device 3 to perform the method 30 according to any of the described embodiments thereof.

The present disclosure also encompasses computer program products 41 comprising a computer program 42 for implementing the embodiments of the method as described, and a computer readable means on which the computer program 42 is stored.

The computer program products, or the memories, comprises instructions executable by the processor 50. Such instructions may be comprised in a computer program, or in one or more software modules or function modules.

In an aspect, means are provided, e.g. function modules, that can be implemented using software instructions such as computer program executing in a processor and/or using hardware, such as application specific integrated circuits, field programmable gate arrays, discrete logical components etc., or any combination thereof.

In particular, a serving device is provided for establishing a computational puzzle for use in communication between a client device and the serving device. The serving device comprises first means for establishing the computational puzzle based on auxiliary information encoded in a second part s″ of a solution s′, s″ of the computational puzzle and on the solution s′, s″ of the computational puzzle. The first means may for instance comprise processing circuitry adapted for establishing puzzles using program code of a memory.

Figure 9:
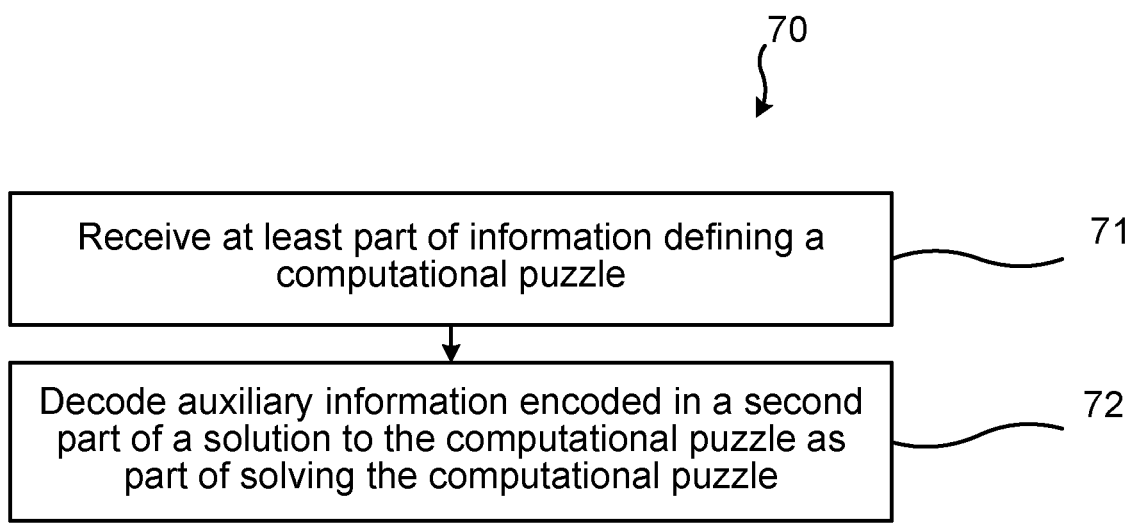
FIG. 9 illustrates a flow chart over steps of an embodiment of a method in a client device in accordance with the present teachings.

FIG. 9 illustrates a flow chart over steps of an embodiment of a method in a client device in accordance with the present teachings.

A method 70 is provided for a client device 2 of solving a computational puzzle for use in communication between the client device 2 and a serving device 3. The method 70 comprises receiving 71, from the serving device 3, at least part of information defining a computational puzzle.

The method 70 comprises decoding 72 auxiliary information encoded in a second part s" of a solution s', s" of the computational puzzle as part of solving the computational puzzle.

In an embodiment, the solving the computational puzzle further comprises using a key shared by the client device 2 and the serving device 3.

In various embodiments, the auxiliary information comprises one or more of: information about resources to use in a subsequent message, and in particular a subsequent message between the client device 2 and the serving device 3, security information, a password for use in an authentication procedure, and a nonce from which a security key can be derived by a selected category of client devices 2 and wherein the method 70 comprises using the auxiliary information for proceeding further in the communication.

With reference again to FIG. 7, a client device 2 for solving a computational puzzle for use in communication between the client device 2 and a serving device 3 is provided. The client device 2 is configured to receive, from the serving device 3, at least part of information defining a computational puzzle, and decode auxiliary information encoded in a second part s" of a solution s', s" of the computational puzzle as part of solving the computational puzzle.

The client device 2 may be configured to perform the above steps e.g. by comprising a processor 90 and memory 91, the memory 91 containing instructions executable by the processor 90, whereby the client device 2 is operative to perform the steps.

In an embodiment, the client device 2 is configured to solve the computational puzzle by further using a key shared by the client device 2 and the serving device 3.

In various embodiments, the auxiliary information comprises one or more of: information about resources to use in a subsequent message, security information, a password for use in an authentication procedure, and a nonce from which a security key can be derived by a selected category of client devices 2 and wherein the method 70 comprises using the auxiliary information for proceeding further in the communication.

With reference again to FIG. 7, the present teachings provide computer programs 92 for the client device 2. The computer program 92 comprises computer program code, which, when executed on at least one processor 90 on the client device 2 causes the client device 2 to perform the method 70 according to any of the described embodiments thereof.

The present disclosure also encompasses computer program products 91 comprising a computer program 92 for implementing the embodiments of the method 70 as described, and a computer readable means on which the computer program 92 is stored.

The computer program products, or the memories, comprises instructions executable by the processor 90. Such instructions may be comprised in a computer program, or in one or more software modules or function modules.

In an aspect, means are provided, e.g. function modules, that can be implemented using software instructions such as computer program executing in a processor and/or using hardware, such as application specific integrated circuits, field programmable gate arrays, discrete logical components etc., or any combination thereof.

In particular, client device for solving a computational puzzle for use in communication between the client device and a serving device is provided. The client device comprises first means for at least part of information defining a computational puzzle. The first means may for instance comprise receiving circuitry, antenna devices, interfaces and/or processing circuitry for reception of data. The first means may for instance comprise the input/output device 94 described with reference to FIG. 7.

The client device comprises second means for decoding auxiliary information encoded in a second part of the solution to the computational puzzle as part of solving the computational puzzle. The second means may for instance comprise processing circuitry adapted to decode the auxiliary information using program code stored in a memory. The first means may for instance comprise processing circuitry 93 described with reference to FIG. 7.

The client device may comprise yet additional means for implementing any of the features and steps of the embodiments that have been described.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for a serving device of establishing a computational puzzle for use in communication between a client device and the serving device, the method comprising:
   establishing, in the serving device, the computational puzzle based on a key shared by the client device and the serving device and on a solution to the computational puzzle, the computational puzzle being computationally asymmetric in that the computational puzzle is harder to solve, even given the shared key, than to create.

2. The method of claim 1, wherein the establishing further comprises encoding, by the serving device, auxiliary information in a second part of the solution.

3. The method of claim 1, comprising adapting level of difficulty of solving the computational puzzle by setting number of bits in at least one of the computational puzzle, a first part of the solution and a second part of the solution accordingly.

4. A serving device for establishing a computational puzzle for use in communication with a client device, the serving device comprising:
   a communication interface; and
   processing circuitry operatively coupled to the communication interface and configured to establish the computational puzzle based on a key shared by the client device and the serving device and on a solution to the computational puzzle, the computational puzzle being computationally asymmetric in that the computational puzzle is harder to solve, even given the shared key, than to create.

5. The serving device of claim 4, wherein the processing circuitry is configured to further encode auxiliary information in a second part of the solution.

6. The serving device of claim 4, wherein the processing circuitry is configured to adapt level of difficulty of solving the computational puzzle by setting number of bits in at least one of: the computational puzzle, a first part of the solution and a second part of the solution accordingly.

7. A method for a client device of solving a computational puzzle for use in communication between the client device and a serving device, the method comprising:
- receiving, from the serving device, at least part of information defining a computational puzzle, the computational puzzle being computationally asymmetric in that the computational puzzle is harder to solve than to create, and
- solving, in the client device, the computational puzzle by using a key shared by the client device and the serving device, wherein the computational puzzle is computationally asymmetric even given the shared key.

8. The method of claim 7, wherein the solving further comprises decoding auxiliary information encoded in a second part of the solution.

9. A client device for solving a computational puzzle for use in communication between the client device and a serving device, the client comprising:
- a communication interface; and
- processing circuitry operatively coupled to the communication interface and configured to:
  - receive, from the serving device, at least part of information defining a computational puzzle, the computational puzzle being computationally asymmetric in that the computational puzzle is harder to solve than to create, and
  - solve, in the client device, the computational puzzle by using a key shared by the client device and the serving device, wherein the computational puzzle is computationally asymmetric even given the shared key.

10. The client device of claim 9, wherein the processing circuitry is configured to solve by further decoding auxiliary information encoded in a second part of the solution.

11. A method for a serving device of establishing a computational puzzle for use in communication between a client device and the serving device, the method comprising:
- establishing the computational puzzle based on auxiliary information encoded in a second part of a solution of the computational puzzle and on the solution of the computational puzzle, the computational puzzle being computationally asymmetric in that the computational puzzle is harder to solve than to create.

12. The method of claim 11, wherein the establishing is further based on a key shared by the client device and the serving device.

13. The method of claim 11, comprising adapting level of difficulty of solving the computational puzzle by setting number of bits of at least one of: the computational puzzle, a first part of the solution and a second part of the solution accordingly.

14. A serving device for establishing a computational puzzle for use in communication between a client device and the serving device, the serving device comprising:
- a communication interface; and
- processing circuitry operatively coupled to the communication interface and configured to establish the computational puzzle based on auxiliary information encoded in a second part of a solution of the computational puzzle and on the solution of the computational puzzle, the computational puzzle being computationally asymmetric in that the computational puzzle is harder to solve than to create.

15. The serving device of claim 14, wherein the processing circuitry is configured to establish further based on a key shared by the client device and the serving device.

16. The serving device of claim 14, wherein the processing circuitry is configured to adapt level of difficulty of solving the computational puzzle by setting number of bits of at least one of: the computational puzzle, a first part of the solution and a second part of the solution accordingly.

17. A method for a client device of solving a computational puzzle for use in communication between the client device and a serving device, the method comprising:
- receiving, from the serving device, at least part of information defining a computational puzzle, the computational puzzle being computationally asymmetric in that the computational puzzle is harder to solve than to create, and
- decoding auxiliary information encoded in a second part of a solution of the computational puzzle as part of solving the computational puzzle.

18. The method of claim 17, wherein solving the computational puzzle further comprises using a key shared by the client device and the serving device.

19. A client device for solving a computational puzzle for use in communication between the client device and a serving device, the client device comprising:
- a communication interface; and
- processing circuitry operatively coupled to the communication interface and configured to:
  - receive, from the serving device, at least part of information defining a computational puzzle, the computational puzzle being computationally asymmetric in that the computational puzzle is harder to solve than to create, and
  - decode auxiliary information encoded in a second part of a solution to the computational puzzle as part of solving the computational puzzle.

20. The client device of claim 19, wherein the processing circuitry is configured to solve the computational puzzle by further using a key shared by the client device and the serving device.

* * * * *